(12) United States Patent  
Scarf

(10) Patent No.: US 11,022,079 B1  
(45) Date of Patent: Jun. 1, 2021

(54) DUAL ELEMENT ENGINE GAS VALVE

(71) Applicant: Deere & Company, Moline, IL (US)

(72) Inventor: Randy R. Scarf, Gladbrook, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/797,653

(22) Filed: Feb. 21, 2020

(51) Int. Cl.
| | |
|---|---|
| F02M 26/38 | (2016.01) |
| F02M 26/65 | (2016.01) |
| F16K 11/052 | (2006.01) |
| F02M 26/23 | (2016.01) |
| F02M 26/42 | (2016.01) |
| F16K 31/524 | (2006.01) |
| F02M 26/69 | (2016.01) |
| F16K 1/22 | (2006.01) |
| F16K 31/52 | (2006.01) |

(52) U.S. Cl.
CPC ............ *F02M 26/38* (2016.02); *F02M 26/23* (2016.02); *F02M 26/42* (2016.02); *F02M 26/65* (2016.02); *F02M 26/69* (2016.02); *F16K 1/223* (2013.01); *F16K 11/0525* (2013.01); *F16K 31/521* (2013.01); *F16K 31/52441* (2013.01)

(58) Field of Classification Search
CPC . F02M 26/69; F16K 31/521; F16K 31/52441; F16K 1/223
See application file for complete search history.

(56) References Cited

U.S. PATENT DOCUMENTS

| | | | | | |
|---|---|---|---|---|---|
| 2,349,727 | A | * | 5/1944 | Hopkins | F16K 1/221 137/552 |
| 3,633,626 | A | * | 1/1972 | Zirps | F16K 1/222 137/637.3 |
| 3,934,851 | A | * | 1/1976 | Illing | F16K 1/22 251/248 |
| 4,020,809 | A | * | 5/1977 | Kern | F02D 9/04 123/568.24 |
| 4,924,840 | A | * | 5/1990 | Wade | F02D 21/08 123/568.19 |
| 5,036,816 | A | * | 8/1991 | Mann | F02M 3/07 123/361 |
| 5,168,900 | A | * | 12/1992 | Johnson | F16K 1/223 137/637.3 |
| 5,427,141 | A | * | 6/1995 | Ohtsubo | F02D 9/06 137/595 |
| 6,263,917 | B1 | * | 7/2001 | Evans | F02D 9/101 137/595 |

(Continued)

*Primary Examiner* — Kevin R Steckbauer  
(74) *Attorney, Agent, or Firm* — Klintworth & Rozenblat IP LLP

(57) ABSTRACT

An engine gas valve with a valve housing manifold with at least one flow passage and an annular clutch body arranged within the valve housing manifold. A drive shaft is arranged such that at least a portion of the drive shaft is positioned concentrically within the clutch body. A first valve element is supported on the drive shaft to rotate with the drive shaft within the at least one flow passage and a second valve element supported on the clutch body within the at least one flow passage. An actuator is coupled to the drive shaft to pivot the drive shaft between a first state in which the first and second valve elements are closed, a second state in which the first valve element is open and the second valve element is closed, and a third state in which the first and second valve elements are open.

20 Claims, 7 Drawing Sheets

(56) References Cited

U.S. PATENT DOCUMENTS

| | | | |
|---|---|---|---|
| 7,017,560 B2 | 3/2006 | Eriksson et al. | |
| 7,168,682 B2 | 1/2007 | Nanba et al. | |
| 7,621,128 B2 | 11/2009 | Czarnowski et al. | |
| 7,735,467 B2* | 6/2010 | Wong | F02D 11/106 |
| | | | 123/336 |
| 7,814,748 B2* | 10/2010 | Nydam | F02D 9/1095 |
| | | | 60/324 |
| 8,342,206 B2 | 1/2013 | Gierszewski | |
| 8,887,761 B2* | 11/2014 | Yokoyama | F02M 26/26 |
| | | | 137/601.11 |
| 9,657,689 B2* | 5/2017 | Baasch | F02M 26/70 |
| 9,927,044 B2* | 3/2018 | Kezar | F16K 1/52 |
| 10,107,237 B2* | 10/2018 | Lim | F16K 31/44 |
| 10,184,566 B2* | 1/2019 | Haesen | F02M 26/26 |
| 10,267,200 B2* | 4/2019 | Janssens | F01N 5/02 |
| 10,273,910 B1* | 4/2019 | Elias | F02D 41/221 |
| 2009/0114868 A1 | 5/2009 | Lee | |
| 2012/0056118 A1* | 3/2012 | Yokoyama | F02M 26/54 |
| | | | 251/248 |
| 2013/0206117 A1 | 8/2013 | Takeda et al. | |
| 2014/0252259 A1* | 9/2014 | Yokoyama | F16C 23/041 |
| | | | 251/305 |
| 2015/0096284 A1* | 4/2015 | Gottemoller | F02M 26/69 |
| | | | 60/278 |
| 2015/0176538 A1* | 6/2015 | Baasch | F02M 26/26 |
| | | | 123/568.12 |
| 2016/0032871 A1* | 2/2016 | Keefover | F02M 26/10 |
| | | | 123/559.1 |
| 2017/0074407 A1* | 3/2017 | Haesen | F16K 1/221 |
| 2017/0176044 A1* | 6/2017 | Kezar | F16H 21/44 |
| 2017/0268466 A1* | 9/2017 | Lim | F02M 26/70 |

* cited by examiner

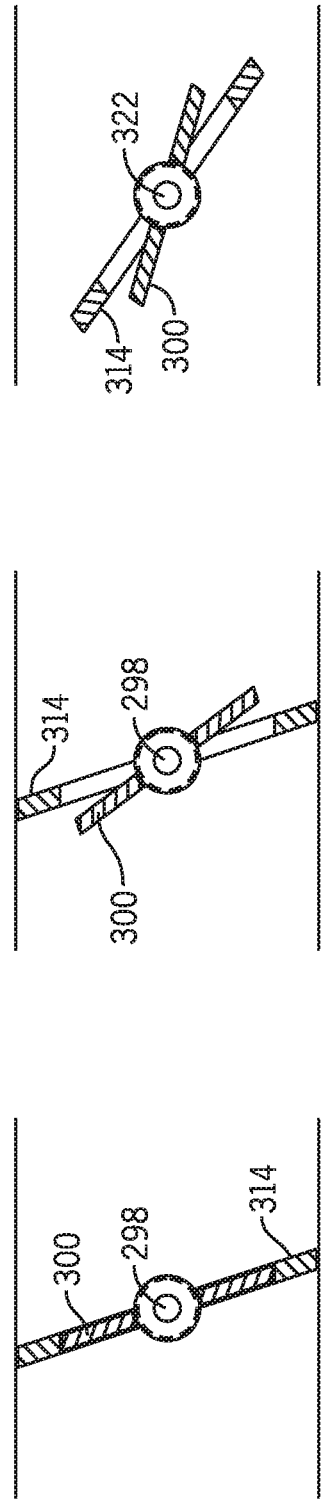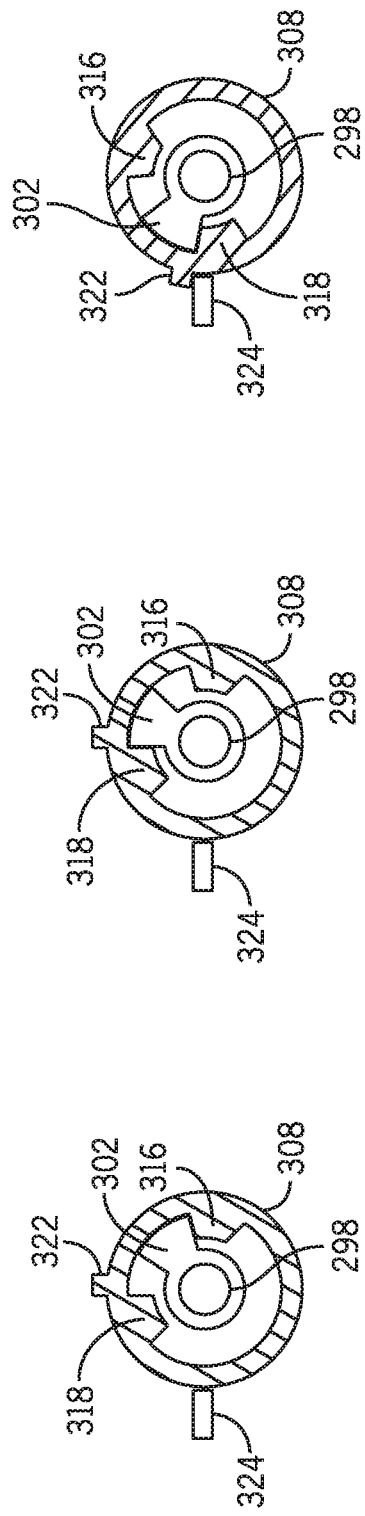

DUAL ELEMENT ENGINE GAS VALVE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to engine gas valves incorporated into work vehicle power systems and methods.

BACKGROUND OF THE DISCLOSURE

Heavy work vehicles, such as used in the construction, agriculture and forestry industries, typically include a power system with an internal combustion engine in the form of a compression ignition engine (i.e., diesel engine) or a spark ignition engine (i.e., gasoline engine). For many heavy work vehicles, the power system includes a diesel engine that may have higher lugging, pull-down, and torque characteristics for associated work operations. Typically, a portion of the exhaust may be redirected back into the engine in an exhaust recirculation arrangement, while the remaining exhaust is directed into an exhaust treatment system and out of the vehicle. Various valves are used to distribute different stages of gas into, out of, and through the engine and associated systems.

SUMMARY OF THE DISCLOSURE

The disclosure provides one or more dual element engine gas valves for a power system of a work vehicle.

In one aspect, the disclosure provides an engine gas valve with a valve housing manifold with at least one flow passage defined by a passage wall and an annular clutch body at least partially arranged within the valve housing manifold. The clutch body has an inner peripheral surface with at least a first clutch cog and a second clutch cog extending radially from the inner peripheral surface. The engine gas valve further includes a drive shaft at least partially arranged within the valve housing manifold such that at least a portion of the drive shaft is positioned concentrically within the clutch body. The drive shaft includes at least one drive cog positioned within the clutch body between the first clutch cog and the second clutch cog. The engine gas valve further includes a first valve element supported on the drive shaft to rotate with the drive shaft within the at least one flow passage and a second valve element supported on the clutch body to rotate with the clutch body within the at least one flow passage. The engine gas valve further includes an actuator coupled to the drive shaft to pivot the drive shaft between at least a first state in which the first valve element and the second valve element are closed, a second state in which the first valve element is open and the second valve element is closed, and a third state in which the first valve element and the second valve element are open. In the first state, the drive shaft is positioned such that the at least one drive cog abuts the first clutch cog. In the second state, the drive shaft is positioned such that the at least one drive cog is separated from the first clutch cog of the clutch body and is circumferentially between the first clutch cog and the second clutch cog of the clutch body. In the third state, the drive shaft is positioned such that the at least one drive cog abuts and drives the second clutch cog to pivot the clutch body.

In another aspect, the disclosure provides a power system with an engine configured to receive and combust intake gas to generate energy, thereby producing an exhaust gas; an intake apparatus configured to direct fresh intake gas into the engine as at least a first portion of the intake gas; an exhaust gas recirculation (EGR) system fluidly coupled to direct a first portion of the exhaust gas back into the engine as at least a second portion of the intake gas; and an engine gas valve fluidly coupled to modulate the exhaust gas from the engine. The engine gas valve includes a valve housing manifold with at least one flow passage defined by a passage wall and an annular clutch body at least partially arranged within the valve housing manifold. The clutch body has an inner peripheral surface with at least a first clutch cog and a second clutch cog extending radially from the inner peripheral surface. The engine gas valve includes a drive shaft at least partially arranged within the valve housing manifold such that at least a portion of the drive shaft is positioned concentrically within the clutch body. The drive shaft includes at least one drive cog positioned within the clutch body between the first clutch cog and the second clutch cog. The engine gas valve includes a first valve element supported on the drive shaft to rotate with the drive shaft within the at least one flow passage and a second valve element supported on the clutch body to rotate with the clutch body within the at least one flow passage. The engine gas valve includes an actuator coupled to the drive shaft to pivot the drive shaft between at least a first state in which the first valve element and the second valve element are closed, a second state in which the first valve element is open and the second valve element is closed, and a third state in which the first valve element and the second valve element are open. In the first state, the drive shaft is positioned such that the at least one drive cog abuts the first clutch cog. In the second state, the drive shaft is positioned such that the at least one drive cog is separated from the first clutch cog of the clutch body and is circumferentially between the first clutch cog and the second clutch cog of the clutch body. In the third state, the drive shaft is positioned such that the at least one drive cog abuts and drives the second clutch cog to pivot the clutch body.

The details of one or more embodiments are set forth in the accompanying drawings and the description below. Other features and advantages will become apparent from the description, the drawings, and the claims.

BRIEF DESCRIPTION OF THE DRAWINGS

FIGS. 9A, 9B, and 9C are cross-sectional views of the engine gas throttle valve through line 9-9 of FIG. 7 in various positions in accordance with an example embodiment; and FIGS. 10A, 10B, and 10C are cross-sectional views of the engine gas throttle valve through line 10-10 of FIG. 7 in various positions in accordance with an example embodiment.

Like reference symbols in the various drawings indicate like elements.

DETAILED DESCRIPTION

Figure 1:
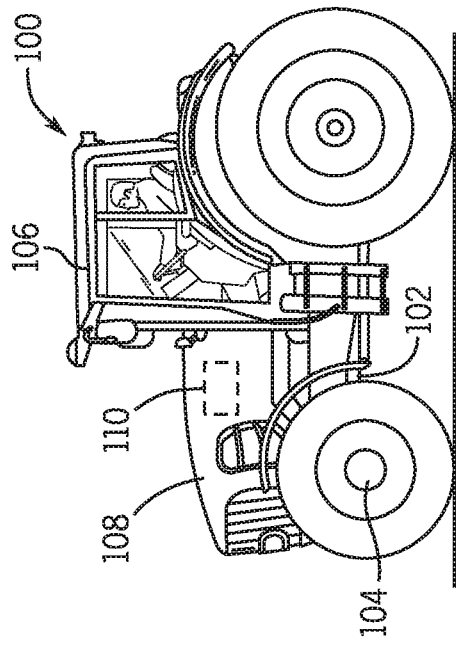
FIG. 1 is a side view of an example work vehicle in the form of a tractor in which a power system with one or more dual element engine gas valves may be used in accordance with this disclosure.

The following describes one or more example embodiments of the disclosed dual element engine gas valves and associated power system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," "circumferential," "lateral", and "transverse" may be used. Such terms are defined, at least in part, with respect to an annular passages, shafts, or components, and/or the direction of exhaust flow. As used herein, the term "longitudinal" indicates an orientation along the length of the subject element; the term "lateral" indicates an orientation along a width of the apparatus and orthogonal to the longitudinal orientation; and the term "transverse" indicates an orientation along the height of the apparatus and orthogonal to the longitudinal and lateral orientations.

As noted, work vehicles may include power systems with diesel engines to produce torque in a wide range of applications, such as long-haul trucks, tractors, agricultural or construction vehicles, surface mining equipment, non-electric locomotives, stationary power generators and the like. During the combustion process, diesel engines generate exhaust. A portion of the exhaust may be redirected back into the engine in an exhaust gas recirculation (EGR) arrangement while the remaining exhaust is directed into an exhaust treatment system and out of the vehicle. In some examples, the EGR arrangement functions to reduce nitrogen oxide (NOx) emissions by lowering the oxygen concentration in the combustion chamber, as well as through heat absorption. The exhaust treatment system functions to remove particulates, nitrogen oxides (NOx), and other types of pollutants. These systems facilitate compliance with increasingly strict emissions standards and provide operational improvements.

As described herein, the power system may include one or more dual element engine gas valves that control or modulate various gas flows through the engine and associated systems. In one embodiment, the dual element gas valve may include dual valve elements that modulate the gas flow through individual and separate paths, such as an EGR distribution valve that selectively modulates gas flow through a primary or cooler gas passage and through a bypass gas passage. In another embodiment, the dual element gas valve may include dual valve elements that modulate the gas flow through a single path, such as a gas throttle valve that selectively modulates gas flow through an exhaust passage, e.g., with a smaller valve element that enables a lesser amount of gas flow and with a larger valve element that enables a greater amount of gas flow. Such dual valve element embodiments may be implemented with a single actuator.

The following describes one or more example implementations of the disclosed systems and methods for improving the power system, particularly aspects of dealing with the exhaust and other gas flows of power systems, as compared to conventional systems. Discussion herein may sometimes focus on the example application of power system in a tractor, but the disclosed power system is applicable to other types of work vehicles and/or other types of engine systems.

Referring to FIG. 1, in some embodiments, the disclosed dual element gas valves and associated power systems and methods may be used with a work vehicle 100. As shown, the work vehicle 100 may be considered to include a main frame or chassis 102, a drive assembly 104, an operator platform or cabin 106, and a power system 108. As is typical, the power system 108 includes an internal combustion engine used for propulsion of the work vehicle 100 via the drive assembly 104 based on commands from an operator in the cabin 106.

As described below, the power system 108 may include systems and components to facilitate various aspects of operation. For example, the power system 108 may include an engine, an intake apparatus to direct air into the engine, a turbocharger to improve efficient and/or power, an exhaust recirculation (EGR) system that redirects a portion of engine exhaust back into the engine, and an exhaust treatment system that functions to reduce pollutants prior to emission of the engine exhaust into the atmosphere.

As also described below, the power system 108 may include one or more valves and other control elements to distribute, direct, and/or control gas flow through the power system 108 that operate based on signals from a controller 110, generated automatically and/or based on commands from an operator. Such valves include one or more EGR distribution valves and/or one or more throttle valves, as described in greater detail below.

The work vehicle 100 further includes the controller 110 (or multiple controllers) to control one or more aspects of the operation of the work vehicle 100, and in some embodiments, facilitate implementation of the power system 108, e.g., operation of the various valves and other control elements. The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

The work vehicle 100 further includes various sensors that function to collect information about the work vehicle 100. Such information may be provided to the controller 110 for evaluation and/or consideration for operating the power system 108. As examples, the sensors may include operational sensors associated with the vehicle systems and components discussed above, including engine and transmission sensors, fuel sensors, and battery sensors. In one example, the sensors may include one or more temperature or pressure sensors associated with the engine of the power system 108, as referenced in greater detail below.

As introduced above power system 108 includes an engine and associated systems that utilize various types of gas flow. Additional information regarding the power system 108, particularly the valves and other control elements that control gas flows are provided below with reference to FIGS. 2-10. Although not shown or described in detail herein, the work vehicle 100 may include any number of additional or alternative systems, subsystems, and elements.

Figure 2:
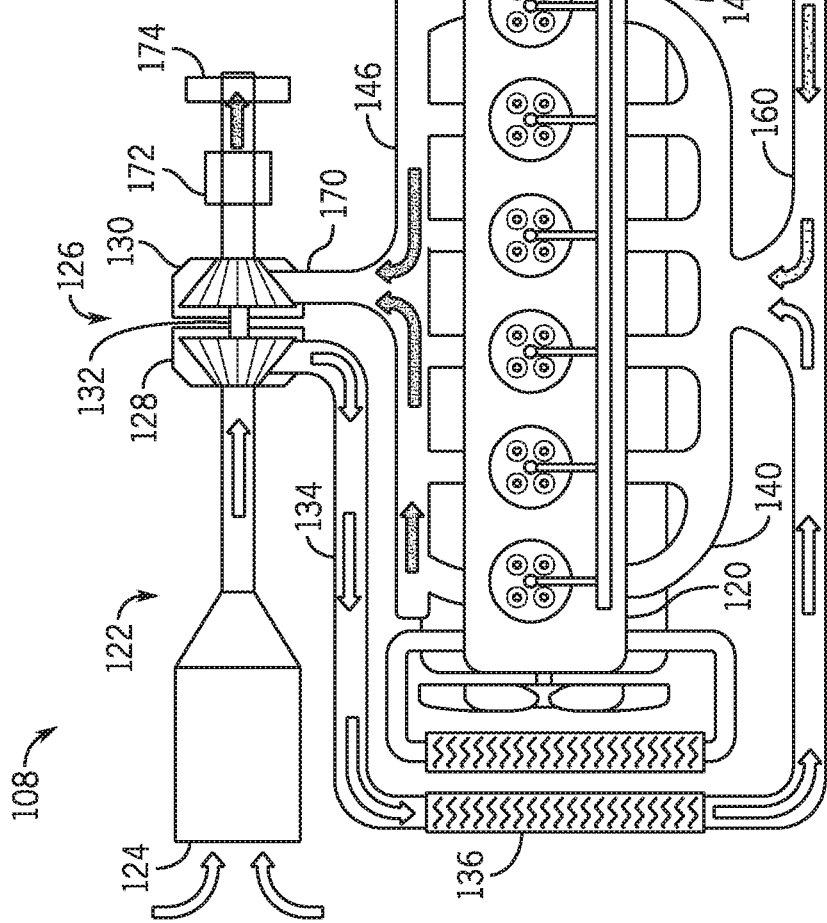
FIG. 2 is a simplified schematic diagram of a power system in accordance with an example embodiment.

Referring to FIG. 2, there is shown a schematic illustration of the power system 108 for providing power to the work vehicle 100 of FIG. 1, although the characteristics described herein may be applicable to a variety of machines, such as on-highway trucks, construction vehicles, marine vessels, stationary generators, automobiles, agricultural vehicles, and recreation vehicles.

As introduced above, the power system 108 includes an engine 120 configured to generate power for propulsion and various other systems. Generally, engine 120 may be any kind of internal combustion engine that receives and combusts intake gas to generate energy and produce an exhaust gas, such as a gasoline engine, a diesel engine, a gaseous fuel burning engine (e.g., natural gas) or any other exhaust producing engine. As an example, the engine 120 described below is a diesel engine. The engine 120 may be of any size with any number or configuration of cylinders 142 within an engine block 144. In addition to those discussed below, the engine 120 may include any suitable feature, such as fuel systems, air systems, cooling systems, peripheries, drivetrain components, sensors, etc.

Generally, the power system 108 and/or engine 120 may be considered to include an intake apparatus 122 that directs fresh or ambient air through an inlet 124 and into the power system 108 as fresh intake gas. As shown, the intake apparatus 122 may include or otherwise interact with a turbocharger 126. In one embodiment, the turbocharger 126 includes a compressor 128 coupled to a turbine 130 via a shaft 132. With respect to the intake apparatus 122, an engine intake conduit 134 directs the fresh intake gas through the compressor 128 of the turbocharger 126 to be compressed, thereby increasing the amount of air subsequently forced into the engine 120 for improved engine efficiency and power output. The compressor 128 may be a fixed geometry compressor, a variable geometry compressor, supercharger, eCompressor, eTurbo, or any other type of compressor. Although not shown, the power system 108 may also have a second turbocharger.

The intake apparatus 122 may further include a charge cooler 136 arranged along the engine intake conduit 134 downstream of the compressor 128 to reduce the temperature of the compressed fresh intake gas. Downstream of the charge cooler 136, the engine intake conduit 134 is fluidly coupled to an intake manifold 140 that receives the fresh intake gas. As described below, the intake manifold 140 may also receive a portion of the engine exhaust as recirculated gas. In some examples, the intake manifold 140 may mix and distribute the fresh intake gas and recirculated gas, while in other examples, the fresh intake gas and recirculated gas may be mixed in an EGR mixer (not shown) prior to entering the intake manifold 140. In any event, the intake manifold 140 distributes the fresh intake gas and/or recirculated gas (generally, intake gas) into the cylinders 142 of the engine block 144. As is typical, the intake gas is mixed with fuel and ignited such that the resulting combustion products drive the mechanical output of the engine 120.

The exhaust gas produced from the combustion process is received by an exhaust manifold 146. A first portion of the exhaust gas is directed through a first exhaust conduit 148 into an EGR system 150 as the recirculated gas. As described in greater detail below, the flow of recirculated gas through the EGR system 150 is at least partially controlled via an EGR distribution valve 152 that is fluidly coupled to each of a first EGR conduit 154 and a second EGR conduit 156. In one example, the EGR distribution valve 152 spans the conduits 154, 156 and includes dual valve elements such that the commanded state of the EGR distribution valve 152 determines the amount of flow through each of the first EGR conduit 154 and the second EGR conduit 156. In effect, and as described in greater detail below, the conduits 154, 156, in combination with the EGR distribution valve 152, provide two potential paths for directing the recirculated exhaust gas to a downstream third EGR conduit 160.

In this embodiment, an EGR cooler 158 is positioned along the first EGR conduit 154 to cool the portion of recirculated gas flowing through the first EGR conduit 154, while the recirculated gas flowing through the second EGR conduit 156 bypasses the EGR cooler 158. As such, the first EGR conduit 154 may be considered a primary (or cooler) EGR conduit in which cooled recirculated gas flows through the EGR cooler 158, and the second EGR conduit 156 may be considered a bypass EGR conduit through which uncooled or bypassed recirculated gas flows. In this manner, the recirculated gas may be cooled by being directed through the primary EGR conduit 154 and EGR cooler 158 by the EGR distribution valve 152 or may bypass the EGR cooler 158 by being directed through the bypass EGR conduit 156 by the EGR distribution valve 152. Although the EGR distribution valve 152 is depicted as being arranged downstream of the EGR cooler 158, in other examples, the EGR distribution valve 152 may be arranged upstream of the EGR cooler 158.

The EGR cooler 158 may be any suitable device configured to lower the temperature of the recirculated gas flowing through the primary EGR conduit 154. Generally, the EGR cooler 158 includes one or more recirculated gas passages and one or more coolant passages arranged such that heat may be transferred from the recirculated gas to the coolant. The coolant may be provided by a cooling circuit and may be, for example, a mixture of ethylene glycol and water, although other fluids may be used, including water Generally, during normal operation, the recirculated gas is directed through the primary EGR conduit 154 and the EGR cooler 158 to reduce the temperature of the recirculated gas prior to entering the engine 120. However, during initial operation, the coolant is relatively cold, and directing the recirculated gas through the EGR cooler 158 with coolant that is too cold may result in undesirable gas flow characteristics, including the fouling of the EGR cooler 158. As such, during certain conditions, it is beneficial to bypass the EGR cooler 158 by directing the recirculated gas through the bypass EGR conduit 156 instead of the primary EGR conduit 154, thereby recirculating the gas while avoiding the EGR cooler 158. This enables operation of the EGR system 150 while the coolant is warming up, which provides a number of benefits, including improved white smoke clean up during start up; decreased NOx output when the components of the exhaust treatment system (e.g., the SCR) are still warming up; and decreased time for the engine and exhaust treatment system to warm up. After the coolant is sufficiently warm, the EGR distribution valve 152 may be operated to initiate the flow of recirculated gas through the primary EGR conduit 154.

As such, the EGR distribution valve 152 may be operated by the controller 110 to appropriately control the recirculated gas through or around the EGR cooler 158 based on conditions such as coolant temperature. Accordingly, the EGR distribution valve 152 may be considered to have at least three states, and in some instances, four states, including: (1) a first state in which first and second valve elements function to close the primary EGR conduit 154 and the bypass EGR conduit 156; (2) a second state in which the first valve element closes the primary EGR conduit 154 while the second valve element is positioned to at least partially open the bypass EGR conduit 156; (3) a third state in which the first and second valve elements function to at least partially open the primary EGR conduit 154 and the bypass EGR conduit 156; and optionally, (4) a fourth state in which the first valve element is positioned to open the primary EGR conduit 154 and the second valve element is positioned to close the bypass EGR conduit 156. In addition to these states, the EGR distribution valve 152 may be commanded into intermediate positions in between states to more precisely modulate the flow through the conduits 154, 156. Additional information regarding the EGR distribution valve 152 is provided below.

As noted above, in a downstream direction, the primary and bypass EGR conduits 154, 156 are fluidly coupled to the third EGR conduit 160 that receives the cooled recirculated gas, the bypass recirculated gas, or a combination of the cooled recirculated gas and the bypass recirculated gas (e.g., based on the state of the EGR distribution valve 152 that directs air through the conduits 154, 156). The third EGR conduit 160 is fluidly coupled to direct the recirculated gas into the intake manifold 140 in which, as introduced above, the combination of the fresh intake gas and the recirculated gas are directed into the engine cylinders 142.

As noted above, only a portion of the exhaust gas from the exhaust manifold 146 is directed through the EGR system 150. The second portion of exhaust gas is directed from the exhaust manifold 146 through a second exhaust conduit 170. The turbine 130 of the turbocharger 126 may be positioned within the path of the second exhaust conduit 170 such that the second portion of the exhaust through the second exhaust conduit 170 rotates the turbine 130 to drive the compressor 128, as introduced above.

The quantity and nature of the exhaust gas through the second exhaust conduit 170 may be controlled by an exhaust gas throttle valve 172 arranged within or on the second exhaust conduit 170. In the depicted example, the exhaust gas throttle valve 172 is arranged downstream of the turbine 130. The exhaust gas throttle valve 172 may be commanded with dual valve elements by the controller 110 into various states or positions to control the flow of exhaust gas through the conduit 170. Additional information regarding the exhaust gas throttle valve 172 is provided below.

The exhaust gas may flow through the exhaust gas throttle valve 172 to an exhaust treatment system 174. Other embodiments may not have an exhaust treatment system 174. Generally, the exhaust treatment system 174 functions to treat the exhaust gas passing therethrough. Although not described in detail, the exhaust treatment system 174 may include various components to reduce undesirable emissions. As examples, the exhaust treatment system 174 may include an inlet tube, diesel oxidation catalyst (DOC), a diesel particulate filter (DPF), a selective catalytic reduction (SCR) system, and an outlet tube. The DOC of the exhaust treatment system 174 may be configured in a variety of ways and contain catalyst materials useful in collecting, absorbing, adsorbing, reducing, and/or converting hydrocarbons, carbon monoxide, and/or nitrogen oxides (NOx) contained in the exhaust. The DPF of the exhaust treatment system 174 may be any of various particulate filters known in the art configured to reduce particulate matter concentrations, e.g., soot and ash, in the exhaust. The SCR system of the exhaust treatment system 174 functions to reduce the amount of NOx in the exhaust flow, such as by selectively injecting a reductant into the flow of exhaust that, upon mixing with the exhaust, evaporates and decomposes or hydrolyzes to produce ammonia, which reacts with NOx for reduction into less harmful emissions. After being treated by the exhaust treatment system 174, the exhaust gas is expelled into the atmosphere via a tailpipe.

Figure 3:
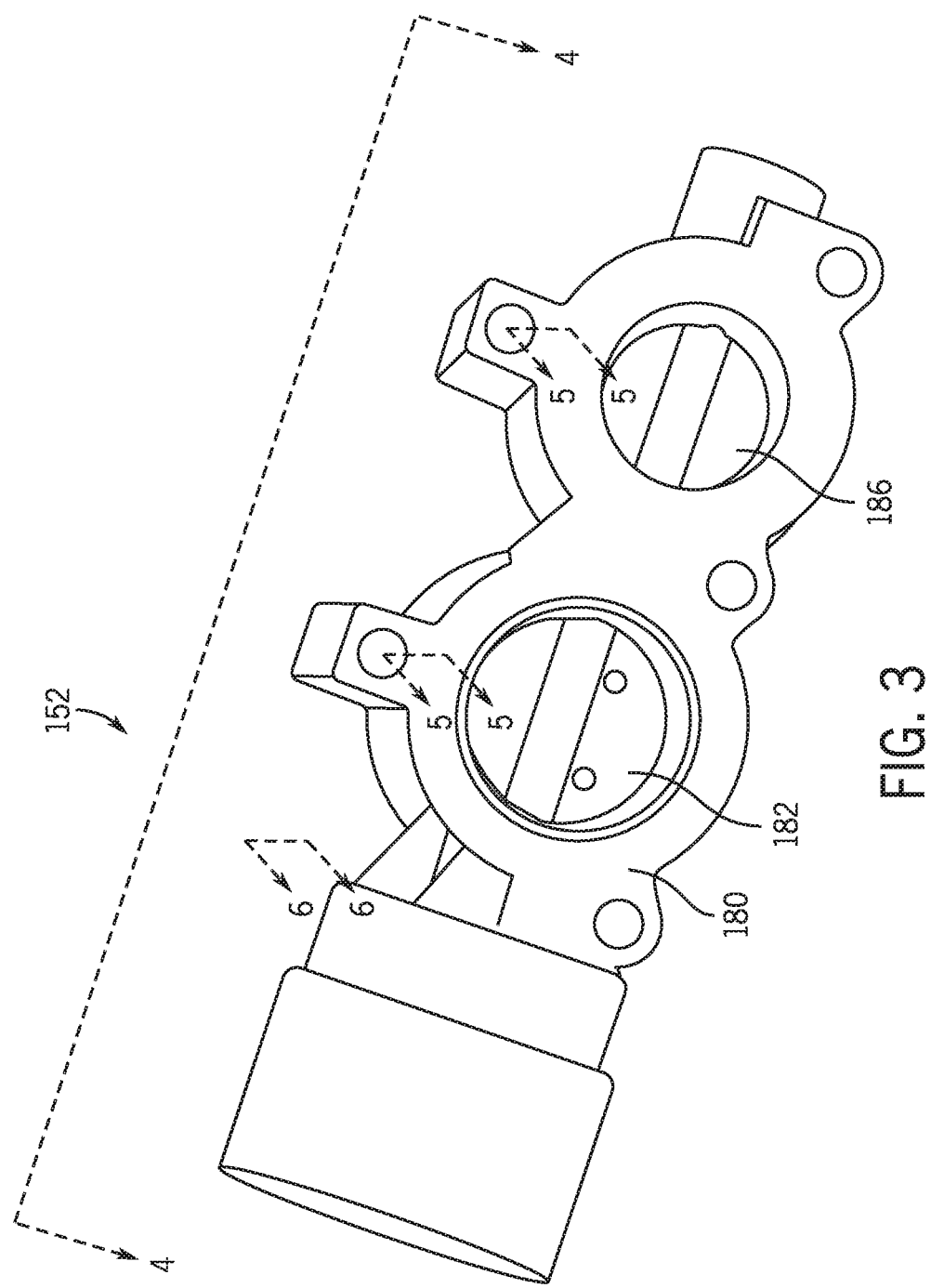
FIG. 3 is an isometric view of a dual element engine gas valve in the form of an EGR distribution valve of the power system of FIG. 2 in accordance with an example embodiment
Figure 4:
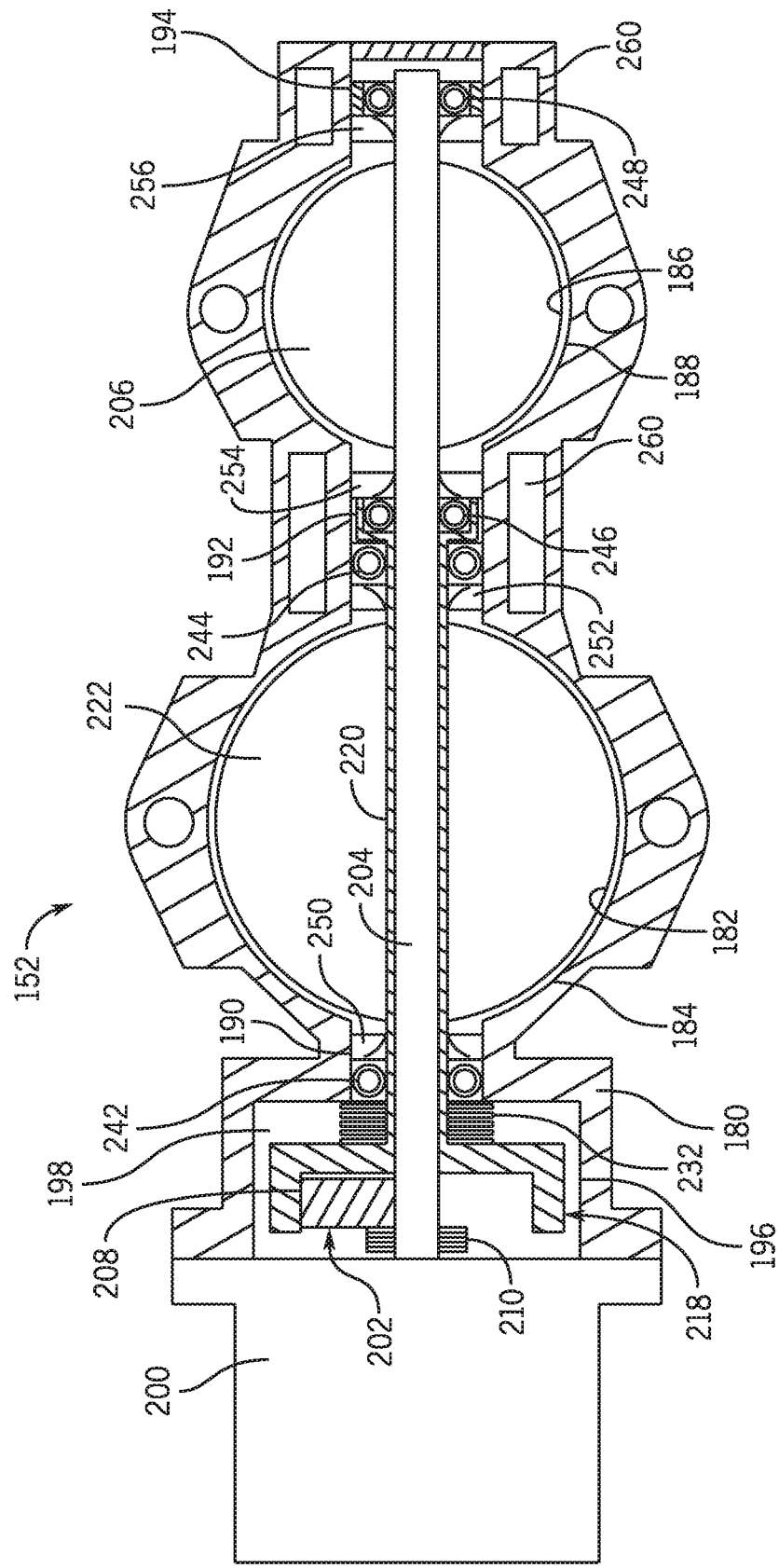
FIG. 4 is a cross-sectional view of the EGR distribution valve through line 4-4 of FIG. 3 in accordance with an example embodiment.

As introduced above, aspects of the power system 108 are regulated by one or more valves, including the EGR distribution valve 152 and the throttle valve 172, with multiple valve elements that advantageously modulate and control the flow of gas through the engine 120 and associated systems. The view of FIG. 3 is an isometric view of the EGR distribution valve 152 removed from the power system 108, and the view of FIG. 4 is a cross-sectional view of the EGR distribution valve 152 through line 4-4 of FIG. 3. Additional reference is made to FIG. 2 in the discussion below.

Generally, the EGR distribution valve 152 is formed by a valve housing manifold 180 defining one or more gas flow passages. In one example, the valve housing manifold 180 forms a primary EGR passage 182 defined by primary EGR passage walls 184 and a bypass passage 186 defined by bypass passage walls 188. In effect, the primary EGR passage 182 is in fluid communication (and/or otherwise forms) a portion of the primary EGR conduit 154 to modulate the flow of recirculated gas through the primary EGR conduit 154, and the bypass EGR passage 186 is in fluid communication (and/or otherwise forms) a portion of the bypass EGR conduit 156 to modulate the flow of recirculated gas through the bypass EGR conduit 156. In addition to the passages 182, 186, the valve housing manifold 180 forms a number of bearing housings 190, 192, 194 and an actuation housing 196 defining an actuation chamber 198, each of which are described in greater detail below.

The EGR distribution valve 152 further includes an actuator 200 mounted within or on the valve housing manifold 180. The actuator 200 is configured to engage and drive a drive device 202, as discussed in greater detail below. The actuator 200 is controlled (e.g., energized, deenergized, commanded) by signals from the controller 110 (FIG. 2) to place the EGR distribution valve 152 in a particular state and/or set of positions. Any suitable type of actuator 200 may be provided, including pneumatic, hydraulic, or electronic with any suitable kind of linkage, gears, or other mechanism for transferring power to rotary motion in response to signals received from the controller (e.g., controller 110 of FIG. 1). In various examples, the actuator 200 may be a direct drive DC motor with gear train, a brushless actuator with gear train and linkage, a DC motor with gear train and linkage, and direct drive brushless actuator with gear train, in which the gear trains may be in the form of two or three gears or a planetary gear system.

In one example, the drive device 202 may be considered to include a drive shaft 204 with a first end coupled to the actuator 200 and extending from the actuation chamber 198, through the bearing housing 190, through the primary EGR passage 182, through the bearing housing 192, through the bypass EGR passage 186, and terminating at the bearing housing 194. As shown, the drive shaft 204 is arranged perpendicular to the flow directions through the primary and bypass EGR passages 182, 186. A flap or butterfly-type valve element 206 (generally, the bypass valve element 206) is arranged on the drive shaft 204 within the bypass EGR passage 186 to block, inhibit, or enable flow of bypassed recirculated exhaust gas through the bypass EGR passage 186 based on the rotational position of the drive shaft 204, as discussed in greater detail below. The bypass EGR passage 182 may be circular or semicircular in cross-sectional and generally cylindrical along a length, and the bypass EGR valve element 206 may have a complimentary shape to the bypass EGR passage 182 such that, in an initial position, the bypass valve element 206 inhibits or prevents gas flow through the passage 182, and may be pivoted into other positions that create a clearance between the bypass valve element 206 and the passage wall 184 such that gas may flow through the passage 182.

The drive device 202 further includes a drive cog (or cam) 208 mounted on the drive shaft 204 within the actuation chamber 198 that enables interaction of the drive device 202 with other actuation elements, as discussed in greater detail.

Additionally, the drive device 202 includes a return spring 210 arranged within the actuation chamber 198 with a first end of the return spring 210 coupled to the drive shaft 204 and a second end coupled to the valve housing manifold 180 (or another stationary element).

As described in greater detail below, the actuator 200 may be controlled to drive the drive shaft 204 from an initial position in at least a first direction to reposition drive cog 208 and the bypass valve element 206, thereby biasing the return spring 210, and upon release of force from the actuator 200, the return spring 210 forces the drive shaft 204 in the second direction, including back into the initial position.

The EGR distribution valve 152 further includes a clutch device 218 with a clutch body 220. The clutch body 220 has a first end arranged within the actuation chamber 198 and extends through the first bearing housing 190, through the primary EGR passage 182, and terminates with a second end arranged in the second bearing housing 192. Generally, and as described in greater detail below, the clutch body 220 is hollow with an inner peripheral surface that circumscribes at least a portion of the drive shaft 204. A flap or butterfly-type valve element 222 (generally, the primary valve element 222) is mounted on the clutch body 220 within the primary EGR passage 182. The primary EGR passage 182 may be circular or semicircular in cross-sectional and generally cylindrical along a length, and the primary valve element 222 may have a complimentary shape to the primary EGR passage 182 such that, in an initial position, the primary valve element 222 inhibits or prevents gas flow through the passage 182, and may be pivoted into other positions that create a clearance between the primary valve element 222 and the passage wall 184 such that gas may flow through the passage 182.

As also discussed in greater detail below, the clutch device 218 includes a first clutch cog 224 and a second clutch cog 226 (FIGS. 6A-6D) arranged on an internal peripheral surface within the clutch body 220 in the actuation chamber 198 in a position to interact with the drive cog 208 of the drive device 202. A return spring 232 may be arranged within the actuation chamber 198 with a first end coupled to the clutch body 220 and a second end coupled to the housing manifold 180. Although not shown in FIG. 4, the clutch device 218 further includes a clutch stop 228 (FIGS. 6A-6D) on an outer periphery of the drive shaft 204 that interacts with a housing stop 230 (FIGS. 6A-6D). As described in greater detail below, the clutch body 220 is driven by the actuator 200 via the drive shaft 204 from an initial position in at least a first direction to reposition the primary valve element 222, thereby biasing the return spring 232; and upon release of force from the actuator 200, the clutch return spring 232 forces the clutch body 220 in the second direction, including back into the initial position.

The EGR distribution valve 152 includes bearings 242, 244, 246, 248 arranged within the valve housing manifold 180 to support the drive device 202 and the clutch device 218. The bearings 242, 244, 246, 248 may take any suitable form, such as ball bearings or bushings. In particular, first clutch device bearings 242 are arranged within the first bearing housing 190, and the second clutch device bearings 244 are arranged within the second bearing housing 192. The first and second clutch device bearings 242, 244 support the clutch body 220 on either side of the primary EGR passage 182. Moreover, first drive device bearings 246 are arranged within the second bearing housing 192, and the second drive device bearings 248 are arranged within the third bearing housing 194. The first and second drive device bearings 246, 248 support the drive shaft 204 on either side of the bypass EGR passage 186.

In order to seal the passages 182, 186, the EGR distribution valve 152 further includes various seals 250, 252, 254, 256 that, in this example are washer-type seals circumscribing the respective shaft 204 and body 220. In one example, the first EGR passage seal 250 is arranged within the first bearing housing 190 on the clutch body 220, and the second EGR passage seal 252 is arranged within the second bearing housing 192 on the clutch body 220. The first and second EGR passage seals 250, 252 function to seal the primary EGR passage 182, e.g., to prevent or mitigate recirculated exhaust gas from the primary EGR passage 182 from leaking into the actuation chamber 198 or across the second bearing housing 192 into the bypass EGR passage 186. Additionally, the first bypass passage seal 254 is arranged within the second bearing housing 192 on the drive shaft 204, and the second bypass passage seal 256 is arranged within the third bearing housing 194 on the drive shaft 204. The first and second bypass passage seals 254, 256 function to seal the bypass EGR passage 186, e.g., to prevent or mitigate recirculated exhaust gas from the bypass EGR passage 186 from leaking into across the second bearing housing 192 into the primary EGR passage 182 or out of the EGR distribution valve 152. In some examples, the seals 250, 252, 254, 256 may have other forms, such as labyrinth seals.

In addition to those depicted, any configuration of bearings, bearings, seals, piston rings, and other valve components may be provided. For example, alternate or additional bearings may be arranged in between the clutch device 218 and the drive shaft 204 within, or proximate to, the actuation chamber 198. Further piston rings and//or bushings may be replaced by and/or supplemented by passage seals and/or bearings, and vice versa. The arrangement of such components may depend on the position of the EGR distribution valve 152 relative to the EGR cooler 158 (e.g., hot side or cold side).

In some examples, one or more coolant passages 260 may be arranged within the EGR distribution valve 152, particularly within the valve housing manifold 180 of the EGR distribution valve 152. In the depicted example, coolant passages 260 are provided within the valve housing manifold 180 proximate to the bypass EGR passage 186 to maintain the EGR distribution valve 152 at an acceptable temperature.

As will now be described in greater detail, the EGR distribution valve 152 operates between states in a sequence to modulate the flows of recirculated exhaust gas through the primary EGR passage 182 and through the bypass EGR passage 186 with the single actuator 200. In particular, the actuator 200 drives the drive device 202 to reposition the bypass valve element 206, and the movement of the drive device 202 operates to drive the clutch device 218 to reposition the primary valve element 222. The arrangement of the EGR distribution valve 152 enables partial independent operation of the drive device 202 and corresponding modulation of the bypass valve element 206 relative to the primary valve element 222, while further enabling delayed modulation with respect to initial positions of the primary valve element 222 relative to the bypass valve element 206. As a result, from initial closed positions, the bypass valve element 206 may be partially opened while maintaining the closed position of the primary valve element 222, and at a predetermined position of the bypass valve element 206, the bypass valve element 206 and primary valve element 222 cooperate to begin opening the primary valve element 222, thereby resulting in the opening of both elements 206, 222. In some examples, the EGR distribution valve 152 may be configured such that continued movement of the bypass valve element 206 in the first direction results in the closing of the bypass EGR passage 186 while the drive device 202 and clutch device 218 maintain the open position of the primary valve element 222. Upon removal of the force of the actuator 200 from the drive device 202, the return springs 210, 232 bias the drive device 202 and the clutch device 218 back in the second direction to the initial positions such that the bypass valve element 206 and the primary valve element 222 respectively close the passages 182, 186.

Operation of the EGR distribution valve 152 is depicted by the views of FIGS. 5A-5D and FIGS. 6A-6D in the various states. The views of FIGS. 5A-5D are cross-sectional views of the bypass EGR passage 186 (dashed lines) overlaid onto the primary EGR passage 182 (solid lines) to depict various relative positions of the bypass valve element 206 (dashed lines) and the primary valve element 222 (solid lines). In effect, the views of FIGS. 5A-5D correspond to the cross-sectional view through line 5-5 in FIG. 3 overlaid onto the cross-sectional view through line 5'-5' in FIG. 3. The views of FIGS. 6A-6D are cross-sectional views through line 6-6 in FIG. 3 to depict aspects of the drive device 202 and the clutch device 218 that correspond to the respective positions of the elements 206, 222 of FIGS. 5A-5D. The views of FIGS. 6A-6D particularly depict the drive shaft 204 and drive cog 208 arranged within the clutch body 220 relative to the first and second clutch cogs 224, 226, as well as the clutch stop 228 relative to the housing stop 230.

As noted above, the EGR distribution valve 152 may be commanded into one or more states to control the gas flows through the primary EGR passage 182 (and thus, through the primary EGR conduit 154) and the bypass EGR passage 186 (and thus, the bypass EGR conduit 156). As described in greater detail below, the views of FIGS. 5A and 6A generally correspond to the first state; the views of FIGS. 5B and 6B generally correspond to the second state; the views of FIGS. 5C and 6C generally correspond to the third state; and the views of FIGS. 5D and 6D generally correspond to the fourth state.

Figures 5A, 5B, 5C, 5D:
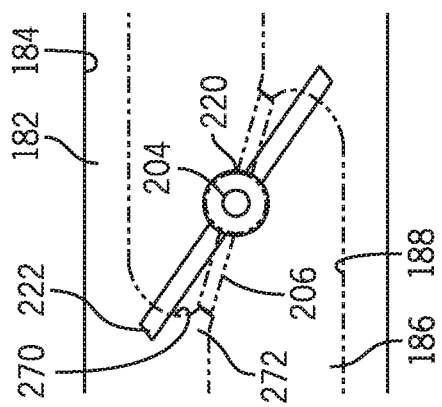
FIGS. 5A, 5B, 5C, and 5D are cross-sectional views of the EGR distribution valve through line 5-5 and line 5'-5' of FIG. 3 in various positions in accordance with an example embodiment.
Figures 6A, 6B, 6C, 6D:
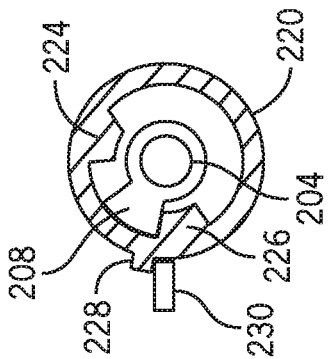
FIGS. 6A, 6B, 6C, and 6D are cross-sectional views of the EGR distribution valve through line 6-6 of FIG. 3 in various positions in accordance with an example embodiment.

Referring initially to FIGS. 5A and 6A, depicting the first state, the drive device 202 and clutch device 218 have initial or closed positions in which the primary valve element 222 closes the primary EGR passage 182 and the bypass valve element 206 closes the bypass EGR passage 186. Each of the initial positions of the valve elements 206, 222 of FIG. 5A may be considered to be an angle of 0°.

In the first state, the actuator 200 is not applying a torque to the drive device 202 or the clutch device 218 such that the return springs 210, 232 (FIG. 4) maintain the devices 202, 218 in the initial positions. In this initial position, as shown in FIG. 5A, the bypass valve element 206 generally abuts the interior surface of the bypass EGR passage wall 184 of the bypass EGR passage 186 to inhibit or prevent recirculated gas from passing across the bypass valve element 206 through the bypass EGR passage 186, and the primary valve element 222 generally abuts the interior surface of the primary EGR passage wall 184 of the primary EGR passage 182 to inhibit or prevent the recirculated exhaust gas from passing across the primary valve element 222 through the primary EGR passage 182. As shown in FIG. 6A, the initial position of the drive shaft 204 of the drive device 202 is such that the drive cog 208 abuts the first clutch cog 224. Similarly, the clutch stop 228 is spaced apart from the housing stop 230.

Now referring to FIGS. 5B and 6B, depicting the second state, the drive device 202 is driven by the actuator 200 in a first direction (e.g., clockwise) to partially open the bypass EGR passage 186 by pivoting the bypass valve element 206 away from the bypass EGR passage wall 188. In this state, the primary EGR passage 182 remains closed with the primary valve element 222 abutting the primary EGR passage wall 184. As an example, the bypass valve element 206 is open to approximately 20°, while the primary valve element 182 remains closed. This operation is also depicted in FIG. 6B in which the actuator 200 (FIG. 4) has pivoted the drive shaft 204 and the associated drive cog 208 in the first direction such that the drive cog 208 is separated from the first clutch cog 224 and approaches the second clutch cog 226. The particular view of FIG. 6B depicts the drive cog 208 just beginning to engage the second clutch cog 226. When the drive cog 208 is within an intermediate position, in between that depicted in FIGS. 6A and 6B, the drive cog 208 does not drive or otherwise interact with the clutch cogs 224, 226 such that the drive device 202 does not drive or otherwise interact with the clutch device 218. As such, in these positions, the bypass valve element 206 may be manipulated to open the bypass EGR passage 186 while maintaining the primary valve element 222 to close the primary EGR passage 182. In other words, the circumferential distance between the first and second clutch cogs 224, 226 and the thickness of the drive cog 208 defines the extent at which the bypass valve element 206 opens while the primary valve element 222 remains closed. The intermediate positions of the bypass valve element 206, represented by the positions in between the positions of FIG. 5A and FIG. 5B may be considered as part of the second state of the EGR distribution valve in which only the bypass EGR passage 186 is open.

Now referring to views of FIGS. 5C and 6C in the third state, as the actuator 200 (FIG. 4) continues (relative to the second state) to pivot the drive device 202 in the first direction, the drive cog 208 on the drive shaft 204 engages the second clutch cog 226 on the clutch device 218 to drive the clutch device 218 in the first direction. As shown by the views of FIGS. 5C and 6C, as the clutch device 218 is driven by the drive device 202, the clutch device 218 pivots in the direction with the drive device 202 such that the bypass valve element 206 and the primary valve element 222 are also pivoted in the first direction. As particularly shown in FIG. 5C, this operation functions to open the primary valve element 222 by pivoting the primary valve element 222 away from primary EGR passage wall 188 such that recirculated exhaust gas may pass between the primary valve element 222 and the primary EGR passage wall 188 and through the primary EGR passage 182.

In this state, the bypass valve element 206 remains open. In one example, as the bypass valve element 206 pivots from the position in FIG. 6B to the position in FIG. 6C, the bypass EGR passage wall 188 may have a curvature 270 to provide a predetermined flow area between the bypass valve element 206 and the bypass EGR passage wall 188 at the curvature 270. In alternative examples, the curvature 270 may be omitted, e.g., the bypass EGR passage 186 may have generally constant cross-sectional areas along the longitudinal direction proximate to the bypass valve element 206. As examples in the third state, the bypass valve element 206 is open approximately to about 10°-30° and the primary valve element 222 is open approximately to about 10°.

Now referring to the views of FIGS. 5D and 6D in the fourth state, the bypass valve element 206 pivots in the first direction until abutting a bypass passage wall closure flange 272 positioned along the curvature 270 on the bypass EGR passage wall 188. The bypass passage wall closure flange 272 provides a closure counter-element for the bypass valve element 206 such that the bypass valve element 206 engages the bypass passage wall closure flange 272 to close the bypass EGR passage 186 as the bypass EGR passage 186 moves in the first direction. In these positions, the bypass valve element 206 closes the bypass EGR passage 186 and the primary valve element 222 opens the primary EGR passage 182. Moreover, as the bypass drive device 202 drives the clutch device 218 in the first direction, at a predetermined position, the clutch stop 228 abuts the housing stop 230 to provide a limit for the drive device 202 and clutch device 218 (and thus, the bypass valve element 206 and the primary valve element 222) in the first direction.

As noted above, in some examples, the curvature 270 and/or the bypass passage wall closure flange 272 may be omitted. In effect, this may result in the omission of the fourth state. In such examples, the bypass valve element 206 opens the bypass EGR passage 186 to a greater extent and maintains the openness of the bypass EGR passage 186 as the primary valve element 222 opens the primary EGR passage 182.

In one example, when the actuator 200 is deenergized from the second, third, or fourth states, the drive device 202 and the clutch device 218 return to the first state in which the bypass valve element 206 and the primary valve element 222 pivot in the second direction to close the bypass EGR passage 186 and the primary EGR passage 182. In particular, as the actuator 200 is deenergized, the force on the drive device 202 is removed, thereby also removing the force on the clutch device 218. Upon removal of these forces, the return spring 210 biases the drive device 202 in the second direction to return to the initial position, and the return spring 232 biases the clutch device 218 in the second direction to the initial position. In some examples, the springs 210, 232 may be omitted and the actuator 200 may be energized and/or operated to provide a force for the drive shaft 204 in the second direction to pivot the bypass valve element 206 in the second direction to close the bypass EGR passage 186, thereby driving the clutch body 220 in the second direction to pivot the primary valve element 222 in the second direction to close the primary EGR passage 182 to place the EGR distribution valve 152 in the first state. In effect, the configuration of the EGR distribution valve 152 enables operation of two valve elements 206, 222, and thus the control of gas flow through two conduits 154, 156 within a single actuator 200.

In some examples, operation of the EGR distribution valve 152 may be embodied as a method. Prior to operation, the EGR distribution valve 152 is placed in the first state in which primary and bypass valve elements 222, 206 function to close the primary EGR conduit 154 and the bypass EGR conduit 156. During initial operation, the coolant is relatively cold, and directing the recirculated gas through the EGR cooler 158 with coolant that is too cold may result in undesirable gas flow characteristics. As such, during these conditions, the EGR distribution valve 152 is placed in a second state in which the primary valve element 222 closes the primary EGR conduit 154 while the second valve element is positioned to at least partially open the bypass EGR conduit 156, thereby bypassing the EGR cooler 158 while still recirculating the gas. After the coolant is sufficiently warm, the EGR distribution valve 152 may be placed in a third state in which the primary and bypass valve elements 222, 206 function to at least partially open the primary EGR conduit 154 and to at least partially open the bypass EGR conduit 156, thereby initiating the flow of recirculated gas through the primary EGR conduit 154 and the bypass EGR conduit 156. In some embodiments, upon the coolant reaching a higher temperature (e.g., during normal operation), EGR distribution valve 152 may be place in the fourth state in which the primary valve element 222 is positioned to open the primary EGR conduit 154 and the bypass valve element 206 is positioned to close the bypass EGR conduit 156, such that all of the recirculated gas passes through the EGR cooler 158.

Figure 7:
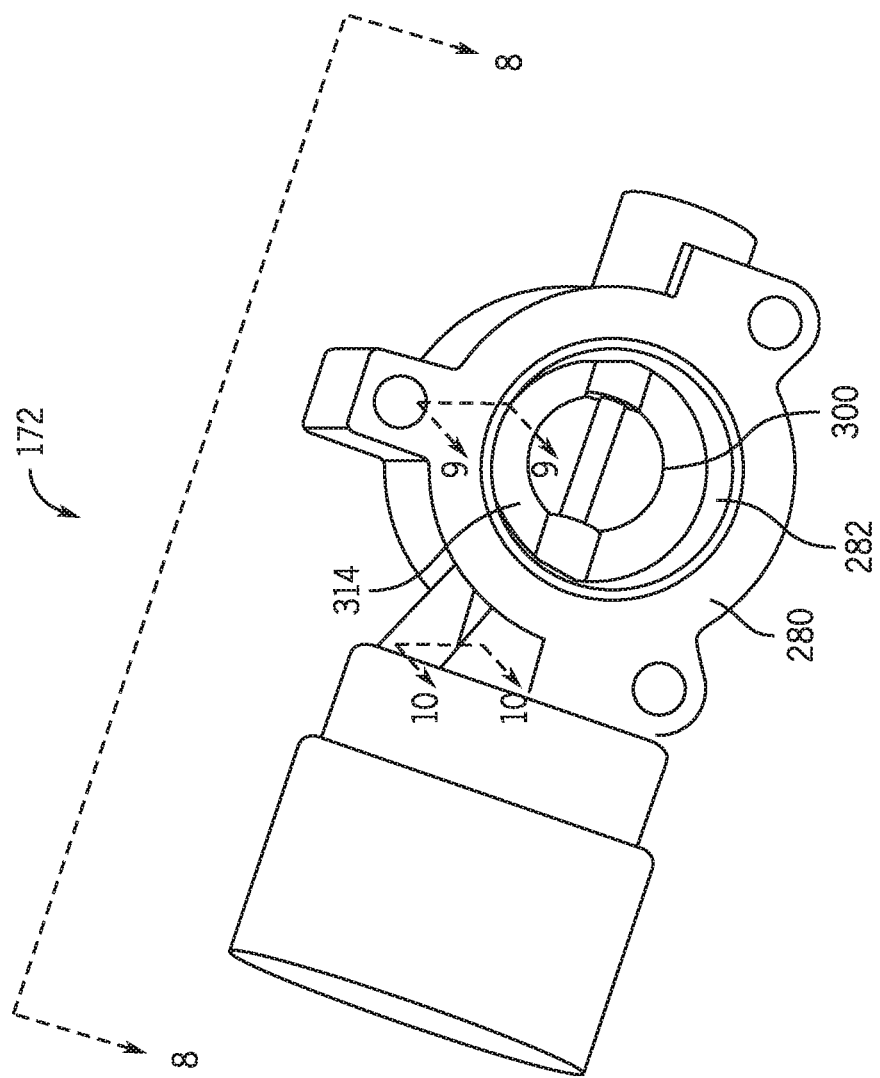
FIG. 7 is an isometric view of a dual element engine gas valve in the form of an engine gas throttle valve of the power system of FIG. 2 in accordance with an example embodiment.
Figure 8:
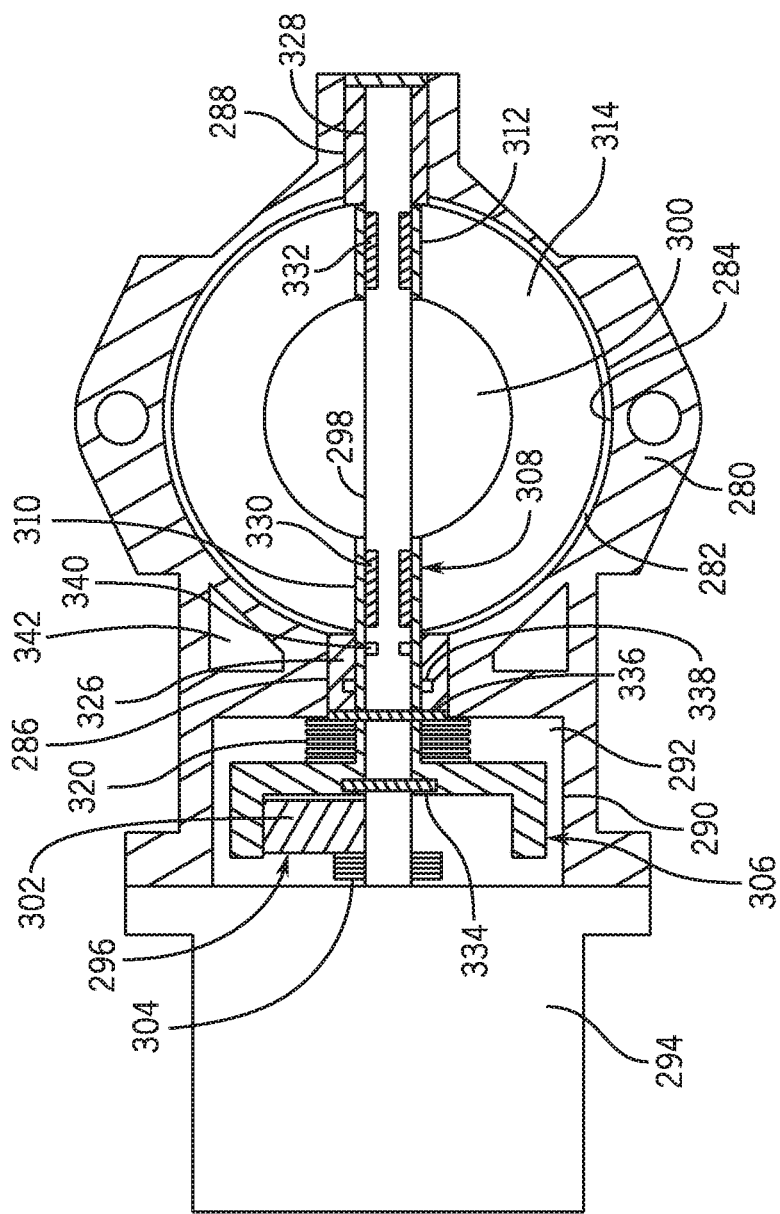
FIG. 8 is a cross-sectional view of the engine gas throttle valve through line 8-8 of FIG. 7 in accordance with an example embodiment.

Reference is now made to FIG. 7, which is an isometric view of the exhaust gas throttle valve 172 removed from the power system 108 that modulates the exhaust gas flow through the second exhaust gas conduit 170, and FIG. 8, which is a cross-sectional view of exhaust gas throttle valve 172 through line 8-8 of FIG. 7. In one example, the exhaust gas throttle valve 172 is formed by a valve housing manifold 280 defining an exhaust gas passage 282 formed by a passage wall 284. In effect, the exhaust gas passage 282 is in fluid communication (and/or otherwise forms) a portion of the exhaust conduit 170 to modulate the flow of exhaust gas. In addition to the passage 282, the valve housing manifold 280 forms one or more bearing housings 286, 288 and an actuation housing 290 defining an actuation chamber 292, each of which are described in greater detail below.

The exhaust gas throttle valve 172 further includes an actuator 294 mounted within or on the valve housing manifold 280. The actuator 294 is configured to engage and drive a drive device 296, as discussed in greater detail below. The actuator 294 is controlled (e.g., energized, deenergized, commanded) by signals from the controller 110 (FIG. 2) to place the exhaust gas throttle valve 172 in a particular state and/or set of positions. Any suitable type of actuator 294 may be provided, including pneumatic, hydraulic, or electronic with any suitable kind of linkage, gears, or other mechanism for transferring power to rotary motion in response to signals received from the controller (e.g., controller 110 of FIG. 1). In various examples, the actuator 294 may be a direct drive DC motor with gear train, a brushless actuator with gear train and linkage, a DC motor with gear train and linkage, and direct drive brushless actuator with a gear train, in which the gear trains may be in the form of two or three gears or a planetary gear system.

In one example, the drive device 296 may be considered to include a drive shaft 298 with a first end coupled to the actuator 294 and extending from the actuation chamber 292, through the bearing housing 286, through the exhaust gas passage 282, and terminating at the bearing housing 288. As shown, the drive shaft 298 is arranged perpendicular to the flow directions through the exhaust gas passage 282. A first flap or butterfly-type valve element 300 (generally, an inner valve element 300) is arranged on the drive shaft 298 within the exhaust gas passage 282 to at least partially block, inhibit, or enable flow of exhaust gas through the exhaust gas passage 282 based on the rotational position of the drive shaft 298, as discussed in greater detail below. The exhaust gas passage 282 may be circular or semicircular in cross-sectional and generally cylindrical along a length, and the inner valve element 300 may have a complimentary shape to the exhaust gas passage 282 and other cooperating elements, discussed below.

The drive device 296 further includes a drive cog (or cam) 302 mounted on the drive shaft 298 within the actuation chamber that enables interaction of the drive device 296 with other actuation elements, as discussed in greater detail. Additionally, the drive device 296 includes a return spring 304 arranged within the actuation chamber 292 with a first end of the return spring 304 coupled to the drive shaft 298 and a second end coupled to the valve housing manifold 280 (or other stationary element).

As described in greater detail below, the actuator 294 may be controlled to drive the drive shaft 298 from an initial position in at least a first direction to reposition drive cog 302 and the inner valve element 300, thereby biasing the drive return spring 304; and upon release of force from the actuator 294, the drive return spring 304 forces the drive shaft 298 in the second direction, including back into the initial position.

The throttle valve 172 further includes a clutch device 306 with a clutch body 308. The clutch body 308 has a first portion 310 arranged within the actuation chamber 292, extending through the first bearing housing 286, and terminating in the exhaust gas passage 282. The clutch body 308 has a second portion 312 arranged within the exhaust gas passage 282 and terminating in the second bearing housing 288. Generally, and as described in greater detail below, the first and second clutch body portions 310, 312 are hollow and circumscribe portions of the drive shaft 298. A flap or butterfly-type valve element 314 (generally, the outer valve element 314) is mounted on the clutch body 308 within the exhaust gas passage 282. In particular, a first side of the outer valve element 314 is mounted on the first portion 310 of the clutch body 308, and a second side of the outer valve element 314 is mounted on the second portion 312 of the clutch body 308.

As also discussed in greater detail below, the clutch device 306 includes a first clutch cog 316 and a second clutch cog 318 (FIGS. 10A-10C) arranged on an internal surface within the clutch body 308 in the actuation chamber 292 in a position to interact with the drive cog 302 of the drive device 296. A return spring 320 may be arranged within the actuation chamber 292 with a first end coupled to the clutch body 308 and a second end coupled to the housing manifold 280. Although not shown in FIG. 8, the clutch device 306 further includes a clutch stop 322 (FIGS. 10A-10C) on an outer periphery of the drive shaft 298 that interacts with a housing stop 324 (FIGS. 10A-10D). As described in greater detail below, the clutch body 308 is driven by the actuator 294 via the drive shaft 298 from an initial position in at least a first direction to reposition the outer valve element 314, thereby biasing the return spring 320; and upon release of force from the actuator 294, the clutch return spring 320 forces the clutch body 308 in the second direction, including back into the initial position.

The exhaust gas throttle valve 172 includes bearings or bushings 326, 328, 330, 332 arranged within the valve housing manifold 280 to support the drive device 296 and the clutch device 306. The bushings 326, 328, 330, 332 may take any suitable form. In particular, clutch device bushings 326 are arranged within the first bearing housing 286 to support the first portion 310 of the clutch body 308. The first drive device bushings 328 are arranged within the second bearing housing 288 to support an end of the drive shaft 298. The second and third drive device bushings 330, 332 are arranged in between the drive shaft 298 and the clutch body portions 310, 312 to support relative movement of the inner valve element 300 and the outer valve element 314. Various lip seals 334, 336 and piston rings 338, 340 may be provided to seal one or more portions of the exhaust gas throttle valve 172.

In some examples, one or more coolant passages 342 may be arranged within the throttle valve 172, particularly within the valve housing manifold 280 of the throttle valve 172. In the depicted example, coolant passages 342 are provided within the valve housing manifold 280 proximate to the exhaust gas passage 282 to maintain the throttle valve 172 at an acceptable temperature.

The exhaust gas passage 282 may be circular or semicircular in cross-sectional and generally cylindrical along a length, and the outer valve element 314 may have a complimentary shape to the exhaust gas passage 282 such that, in an initial position, the outer valve element 314 at least partially inhibits or prevents gas flow through the passage 282, and may be pivoted into other positions that create a clearance between the outer valve element 314 and the passage wall 284 such that gas may flow through the passage 282.

As best shown by FIG. 8, the outer valve element 314 is ring shaped with an inner opening that circumscribes the inner valve element 300. In other words, the inner valve element 300 is arranged within the outer valve element 314. As described in greater detail below, the inner and outer valve elements 300, 314 have initial positions in which the valve elements 300, 314 are oriented in the same plane. In these initial positions, the valve elements 300, 314 cooperate to collectively span effectively all of the cross-sectional area of the exhaust gas passage 282 to prevent or substantially inhibit the flow of exhaust gas through the second exhaust conduit 170 (FIG. 2). Moreover, the inner and outer valve elements 300, 314 are arranged on respective shafts 298 or bodies 308 to pivot about a common axis, at least partially independent of one another. In particular, and as discussed in greater detail below, the inner valve element 300 may be pivoted relative to the outer valve element 314 to partially open the exhaust gas passage 282, and subsequently, the outer valve element 314 may be pivoted relative to the passage walls 284 to more fully open the exhaust gas passage 282.

Operation of the throttle valve 172 is depicted by the views of FIGS. 9A-9C and FIGS. 10A-10C in the various states. The views of FIGS. 9A-9C are cross-sectional views of the bypass EGR passage 186 to depict various relative positions of the inner and outer valve elements 300, 314 through line 9-9 in FIG. 7. The views of FIGS. 10A-100 are cross-sectional views through line 10-10 in FIG. 7 to depict aspects of the drive device 296 and the clutch device 306 that correspond to the respective positions of the valve elements 300, 314 of FIGS. 9A-9C. The views of FIGS. 10A-10C particularly depict the drive shaft 298 and drive cog 302 arranged within the clutch body 308 relative to the first and second clutch cogs 316, 318, as well as the clutch stop 322 relative to the housing stop 324.

As noted above, the throttle valve 172 may be commanded into one or more states to control the relative flow through the exhaust gas passage 282 (and thus, through the exhaust conduit 170). As described in greater detail below, the views of FIGS. 9A and 10A generally correspond to the first state; the views of FIGS. 9B and 10B generally correspond to the second state; and the views of FIGS. 9C and 100 generally correspond to the third state.

Referring initially to FIGS. 9A and 10A, depicting the first state, the drive device 296 and clutch device 306 are in initial or closed positions in which the inner and outer valve elements 300, 314 close the exhaust gas passage 282. Each of the initial positions of the valve elements 300, 314 of FIG. 9A may be considered to be an angle of 0°.

In the first state, the actuator 294 is not applying a torque to the drive device 296 or the clutch device 306 such that the return springs 304, 320 (FIG. 8) maintain the devices 296, 306 in the initial positions. In this initial position, as shown in FIG. 9A, the outer valve element 314 generally abuts the interior surface of the passage wall 284 of the exhaust gas passage 282 and the inner valve element 300 is planar to the outer valve element 314 to inhibit or prevent recirculated gas from passing through the passage 282. As shown in FIG. 10A, the initial position of the drive shaft 298 of the drive device 296 is such that the drive cog 302 abuts the first clutch cog 316. Similarly, the clutch stop 322 is spaced apart from the housing stop 324.

Now referring to FIGS. 9B and 10B, depicting the second state, the drive device 296 is driven by the actuator 294 in a first direction (e.g., clockwise) to partially open a portion of the exhaust gas passage 282 by pivoting the inner valve element 300 out of the plane with the outer valve element 314 to create a clearance in between to allow exhaust gas flow. In this state, the outer valve element 314 remains "closed" or otherwise generally abuts the passage wall 284. As an example, the inner valve element 300 is open to approximately 20°, while the outer valve element 314 remains at approximately 0°. This operation is also depicted in FIG. 10B in which the actuator 294 (FIG. 8) has pivoted the drive shaft 298 and the associated drive cog 302 in the first direction such that the drive cog 302 is separated from the first clutch cog 316 and approaches the second clutch cog 318. The particular view of FIG. 10B depicts the drive cog 302 just beginning to engage the second clutch cog 318. When the drive cog 302 is within a position in between that depicted in FIGS. 10A and 10B, the drive cog 302 does not drive or otherwise interact with the clutch cogs 316, 318 such that the drive device 296 does not drive or otherwise interact with the clutch device 306. As such, in these positions, the inner valve element 300 may be manipulated to partially open the exhaust gas passage 282 while maintaining the outer valve element 314 in this initial position. In other words, the circumferential distance between the first and second clutch cogs 316, 318 and the thickness of the drive cog 302 defines the extent at which the inner valve element 300 opens while the outer valve element 314 remains in the initial position.

Now referring to views of FIGS. 9C and 100 in the third state, as the actuator 294 (FIG. 8) continues (relative to the second state) to pivot the drive device 296 in the first direction, the drive cog 302 on the drive shaft 298 engages the second clutch cog 318 on the clutch device 306 to drive the clutch device 306 in the first direction. As shown by the views of FIGS. 9C and 100, as the clutch device 306 is driven by the drive device 296, the clutch device 306 pivots in the direction with the drive device 296 such that the inner valve element 300 and the outer valve element 314 are also pivoted in the first direction. As particularly shown in FIG. 9C, this operation functions to open the outer valve element 314 by pivoting the outer valve element 314 away from passage wall 284 such that exhaust gas can pass between the outer valve element 314 and the passage wall 284, as well as in between the inner and outer valve elements 300, 314.

The valve elements 300, 314 may be operated by the actuator 294 based on commands from the controller 110 (FIG. 1) according to any suitable schedule or model with consideration on one or more parameters, including engine speed, temperature, pressure, and the like. In particular, the operation of the throttle valve 172 may be embodied as a method executed by the controller 110 (FIG. 1). In one example, when the engine is at idle, the valve 172 is commanded to be closed or relatively closed to produce engine pressure drop to increase the exhaust temperature for the downstream exhaust treatment system 174 (FIG. 2). When the engine 120 (FIG. 2) is at full load, the throttle valve 172 is commanded to be fully open since restriction may result in a loss in fuel economy. As a result, it is beneficial to size the overall passage 282 to be as large as reasonable to reduce pressure drop. However, in typical oversized valve and passage combination, without the dual valve elements (e.g., without the smaller, inner valve element), the leakage rate may be relatively high. In the present embodiment, the smaller, inner valve element 300 may be manipulated to enable a smaller amount of exhaust flow at relatively lower engine speeds and light loads, without requiring manipulation of the larger, outer valve element 314 at these conditions, while still enabling use of the larger, outer valve element 314 at the higher operating conditions for improved fuel economy. As such, the present embodiment enables a lower leakage rate over a greater extent of operating conditions, while maintaining a larger passage for improved fuel economy.

Accordingly, embodiments discussed herein provides dual element engine gas valves for vehicle power systems, including EGR distribution valves and gas throttle valves. The embodiments discussed above provide such valves that operate dual valve elements with a single actuator, thereby providing a significant reduction in space, complexity, and cost relative to other designs. Additionally, the examples described above may enable the engine to operate at elevated temperatures to achieve improved fuel economy, even while maintaining or reducing emission levels of pollutants. Generally, the embodiments above provide of example configurations and arrangements of power system and/or engine configurations. However, the description above is generally applicable to any type of engine and/or vehicle systems.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the following examples are provided, which are numbered for easier reference.

1. An engine gas valve, comprising: a valve housing manifold with at least one flow passage defined by a passage wall; an annular clutch body at least partially arranged within the valve housing manifold, wherein the clutch body has an inner peripheral surface with at least a first clutch cog and a second clutch cog extending radially from the inner peripheral surface; a drive shaft at least partially arranged within the valve housing manifold such that at least a portion of the drive shaft is positioned concentrically within the clutch body, wherein the drive shaft includes at least one drive cog positioned within the clutch body between the first clutch cog and the second clutch cog; a first valve element supported on the drive shaft to rotate with the drive shaft within the at least one flow passage; a second valve element supported on the clutch body to rotate with the clutch body within the at least one flow passage; and an actuator coupled to the drive shaft to pivot the drive shaft between at least a first state in which the first valve element and the second valve element are closed, a second state in which the first valve element is open and the second valve element is closed, and a third state in which the first valve element and the second valve element are open, wherein, in the first state, the drive shaft is positioned such that the at least one drive cog abuts the first clutch cog; wherein, in the second state, the drive shaft is positioned such that the at least one drive cog is separated from the first clutch cog of the clutch body and is circumferentially between the first clutch cog and the second clutch cog of the clutch body; and wherein, in the third state, the drive shaft is positioned such that the at least one drive cog abuts and drives the second clutch cog to pivot the clutch body.

2. The engine gas valve of example 1, wherein the at least one flow passage includes a first flow passage and a second flow passage, wherein the first valve element is positioned within the first flow passage, and the second valve element is positioned within the second flow passage.

3. The engine gas valve of example 2, wherein the valve housing manifold further defines an actuation chamber at least partially housing the actuator.

4. The engine gas valve of example 3, wherein, in a lateral orientation, the second flow passage is positioned in between the actuation chamber and the first flow passage.

5. The engine gas valve of example 4, wherein the drive shaft extends from the actuation chamber, through the second flow passage, and into the first flow passage to position the first valve element within the first flow passage.

6. The engine gas valve of example 5, wherein the clutch body extends from the actuation chamber and into the second flow passage to position the second valve element within the first flow passage.

7. The engine gas valve of example 6, wherein, upon a first transition from the first state into the second state, the drive shaft is pivoted by the actuator such that the first valve element mounted on the drive shaft is pivoted to a first angle that opens the first flow passage, and wherein, upon a second transition from the second state to the third state, the drive shaft is pivoted by the actuator and the at least one drive cog of the drive shaft drives the clutch body via the second clutch cog to pivot the clutch body such that the second valve element mounted on the clutch body is pivoted to a second angle that opens the second flow passage.

8. The engine gas valve of example 7, wherein the at least one drive cog, the first clutch cog, and the second clutch cog are housed within the actuation chamber.

9. The engine gas valve of example 1, further comprising at least one return spring that includes a first return spring coupled to the drive shaft such that, upon deactivation of the actuator in the second state or in the third state, the first return spring biases the drive shaft into the first state.

10. The engine gas valve of example 9, wherein the at least one return spring further includes a second return spring coupled to the clutch body such that, upon deactivation of the actuator in the second state or in the third state, the second return spring biases the clutch body into the first state.

11. The engine gas valve of example 1, wherein the passage wall is formed with a curvature such that, as the drive shaft rotates and the first valve element pivots within the at least one flow passage into the second state or into the third state, a flow path between the first valve element and the passage wall is maintained with a constant area.

12. The engine gas valve of example 1, further comprising a closure flange arranged on the passage wall, wherein the actuator is further configured to pivot the drive shaft into a fourth state in which the drive shaft is positioned such that the at least one drive cog abuts and drives the second clutch cog to pivot the clutch body into a position in which the first valve element abuts the closure flange.

13. The engine gas valve of example 1, wherein the at least one flow passage is a single flow passage.

14. The engine gas valve of example 13, wherein the first valve element is arranged within the second valve element.

15. The engine gas valve of example 14, wherein the valve housing manifold further defines an actuation chamber at least partially housing the actuator, wherein the drive shaft extends from the actuation chamber and through the single flow passage to position the first valve element within the single flow passage, and wherein the clutch body includes a first clutch body portion on a first side of the single flow passage and a second clutch body portion on a second side of the single flow passage to position the second valve element within the single flow passage.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An engine gas valve, comprising:
    a valve housing manifold with at least one flow passage defined by a passage wall;
    an annular clutch body at least partially arranged within the valve housing manifold, wherein the clutch body has an inner peripheral surface with at least a first clutch cog and a second clutch cog extending radially from the inner peripheral surface;
    a drive shaft at least partially arranged within the valve housing manifold such that at least a portion of the drive shaft is positioned concentrically within the clutch body, wherein the drive shaft includes at least one drive cog positioned within the clutch body between the first clutch cog and the second clutch cog;
    a first valve element supported on the drive shaft to rotate with the drive shaft within the at least one flow passage;
    a second valve element supported on the clutch body to rotate with the clutch body within the at least one flow passage; and
    an actuator coupled to the drive shaft to pivot the drive shaft between at least a first state in which the first valve element and the second valve element are closed, a second state in which the first valve element is open and the second valve element is closed, and a third state in which the first valve element and the second valve element are open,
    wherein, in the first state, the drive shaft is positioned such that the at least one drive cog abuts the first clutch cog;
    wherein, in the second state, the drive shaft is positioned such that the at least one drive cog is separated from the first clutch cog of the clutch body and is circumferentially between the first clutch cog and the second clutch cog of the clutch body; and
    wherein, in the third state, the drive shaft is positioned such that the at least one drive cog abuts and drives the second clutch cog to pivot the clutch body.

2. The engine gas valve of claim 1, wherein the at least one flow passage includes a first flow passage and a second flow passage, wherein the first valve element is positioned within the first flow passage, and the second valve element is positioned within the second flow passage.

3. The engine gas valve of claim 2, wherein the valve housing manifold further defines an actuation chamber at least partially housing the actuator.

4. The engine gas valve of claim 3, wherein, in a lateral orientation, the second flow passage is positioned in between the actuation chamber and the first flow passage.

5. The engine gas valve of claim 4, wherein the drive shaft extends from the actuation chamber, through the second flow passage, and into the first flow passage to position the first valve element within the first flow passage.

6. The engine gas valve of claim 5, wherein the clutch body extends from the actuation chamber and into the second flow passage to position the second valve element within the first flow passage.

7. The engine gas valve of claim 6,
    wherein, upon a first transition from the first state into the second state, the drive shaft is pivoted by the actuator such that the first valve element mounted on the drive shaft is pivoted to a first angle that opens the first flow passage, and
    wherein, upon a second transition from the second state to the third state, the drive shaft is pivoted by the actuator and the at least one drive cog of the drive shaft drives the clutch body via the second clutch cog to pivot the clutch body such that the second valve element mounted on the clutch body is pivoted to a second angle that opens the second flow passage.

8. The engine gas valve of claim 7, wherein the at least one drive cog, the first clutch cog, and the second clutch cog are housed within the actuation chamber.

9. The engine gas valve of claim 1, further comprising at least one return spring that includes a first return spring coupled to the drive shaft such that, upon deactivation of the actuator in the second state or in the third state, the first return spring biases the drive shaft into the first state.

10. The engine gas valve of claim 9, wherein the at least one return spring further includes a second return spring coupled to the clutch body such that, upon deactivation of the actuator in the second state or in the third state, the second return spring biases the clutch body into the first state.

11. The engine gas valve of claim 1, wherein the passage wall is formed with a curvature such that, as the drive shaft rotates and the first valve element pivots within the at least one flow passage into the second state or into the third state, a flow path between the first valve element and the passage wall is maintained with a constant area.

12. The engine gas valve of claim 1, further comprising a closure flange arranged on the passage wall, wherein the actuator is further configured to pivot the drive shaft into a fourth state in which the drive shaft is positioned such that the at least one drive cog abuts and drives the second clutch cog to pivot the clutch body into a position in which the first valve element abuts the closure flange.

13. The engine gas valve of claim 1, wherein the at least one flow passage is a single flow passage.

14. The engine gas valve of claim 13, wherein the first valve element is arranged within the second valve element.

15. The engine gas valve of claim 14,
wherein the valve housing manifold further defines an actuation chamber at least partially housing the actuator,
wherein the drive shaft extends from the actuation chamber and through the single flow passage to position the first valve element within the single flow passage, and
wherein the clutch body includes a first clutch body portion on a first side of the single flow passage and a second clutch body portion on a second side of the single flow passage to position the second valve element within the single flow passage.

16. The engine gas valve of claim 15,
wherein, upon a first transition from the first state into the second state, the drive shaft is pivoted by the actuator such that the first valve element mounted on the drive shaft is pivoted to a first angle that opens a first portion of the single flow passage, and
wherein, upon a second transition from the second state to the third state, the drive shaft is pivoted by the actuator and the at least one drive cog of the drive shaft drives the clutch body via the second clutch cog to pivot the clutch body such that the second valve element mounted on the clutch body is pivoted to a second angle that opens a second portion of the single flow passage.

17. The engine gas valve of claim 16, further comprising:
a first return spring coupled to the drive shaft such that, upon deactivation of the actuator in the second state or in the third state, the first return spring biases the drive shaft into the first state; and
a second return spring coupled to the clutch body such that, upon deactivation of the actuator in the second state or in the third state, the second return spring biases the clutch body into the first state.

18. A power system, comprising:
an engine configured to receive and combust intake gas to generate energy, thereby producing an exhaust gas;
an intake apparatus configured to direct fresh intake gas into the engine as at least a first portion of the intake gas;
an exhaust gas recirculation (EGR) system fluidly coupled to direct a first portion of the exhaust gas back into the engine as at least a second portion of the intake gas; and
an engine gas valve fluidly coupled to modulate the exhaust gas from the engine, the engine gas valve comprising:
a valve housing manifold with at least one flow passage defined by a passage wall;
an annular clutch body at least partially arranged within the valve housing manifold, wherein the clutch body has an inner peripheral surface with at least a first clutch cog and a second clutch cog extending radially from the inner peripheral surface;
a drive shaft at least partially arranged within the valve housing manifold such that at least a portion of the drive shaft is positioned concentrically within the clutch body, wherein the drive shaft includes at least one drive cog positioned within the clutch body between the first clutch cog and the second clutch cog;
a first valve element supported on the drive shaft to rotate with the drive shaft within the at least one flow passage;
a second valve element supported on the clutch body to rotate with the clutch body within the at least one flow passage; and
an actuator coupled to the drive shaft to pivot the drive shaft between at least a first state in which the first valve element and the second valve element are closed, a second state in which the first valve element is open and the second valve element is closed, and a third state in which the first valve element and the second valve element are open,
wherein, in the first state, the drive shaft is positioned such that the at least one drive cog abuts the first clutch cog;
wherein, in the second state, the drive shaft is positioned such that the at least one drive cog is separated from the first clutch cog of the clutch body and is circumferentially between the first clutch cog and the second clutch cog of the clutch body; and
wherein, in the third state, the drive shaft is positioned such that the at least one drive cog abuts and drives the second clutch cog to pivot the clutch body.

19. The power system of claim 18,
wherein the EGR system comprises: a first exhaust conduit; an EGR cooler arranged along the first exhaust conduit; and a second exhaust conduit that bypasses the first exhaust conduit and the EGR cooler, and
wherein the at least one flow passage of the engine gas valve includes a first flow passage and a second flow passage, wherein the first valve element is positioned within the first flow passage, and the second valve element is positioned within the second flow passage,
wherein the engine gas valve is an EGR distribution valve arranged such that the first flow passage forms part of the first exhaust conduit and the first valve element is configured to modulate flow through the first exhaust conduit, and such that the second flow passage forms part of the second exhaust conduit and the second valve element is configured to modulate flow through the second exhaust conduit.

20. The power system of claim 18, wherein the engine gas valve is an engine exhaust gas throttle valve that modulates the exhaust gas through the at least one flow passage as a single flow passage in which the first valve element is arranged within the second valve element.

* * * * *